United States Patent [19]

Arco

[11] E Patent Number: Re. 31,670

[45] Reissued Date of Patent: Sep. 11, 1984

[54] ONE-PART SOLVENT-FREE THERMOSETTABLE BLOCKED PREPOLYMER COMPOSITION CONTAINING A DIENE, TOGETHER WITH CHAIN EXTENDER, CHAIN TERMINATOR AND A DIENOPHILE

[75] Inventor: Manuel J. Arco, Stillwater, Minn.

[73] Assignee: Minnesota Mining and Manufacturing Company, St. Paul, Minn.

[21] Appl. No.: 504,799

[22] Filed: Jun. 16, 1983

Related U.S. Patent Documents

Reissue of:

[64] Patent No.: 4,273,909
Issued: Jun. 16, 1981
Appl. No.: 142,651
Filed: Apr. 22, 1980

[51] Int. Cl.[3] ..... C08G 18/10

[52] U.S. Cl. ..... 528/45; 427/369; 427/370; 427/385.5; 428/423.1; 528/61; 528/65; 528/66; 528/73; 528/75

[58] Field of Search ..... 528/45, 61, 65, 66, 528/73, 75; 427/369, 370, 385.5; 428/423.1

[56] References Cited

U.S. PATENT DOCUMENTS

| | | | |
|---|---|---|---|
| 3,435,003 | 3/1969 | Craven | 525/10 |
| 3,808,160 | 4/1974 | Steinmetz | 524/733 |

FOREIGN PATENT DOCUMENTS

| | | |
|---|---|---|
| 970459 | 9/1964 | United Kingdom . |
| 1085454 | 10/1967 | United Kingdom . |

OTHER PUBLICATIONS

"Adhesion and Bonding", Enc. of Polymer Science and Technology, 1, 486, Interscience, 1964.
Levine and Tech Jr., J. Org. Chem., 37, 1500 (1972).
Levine and Fech Jr., J. Paint Tech., 45, (578) 56 (1973).
"Blocked Isocyanates", Z. W. Wicks Jr., Progress in Organic Coatings, 3 (1975) 73-99.

*Primary Examiner*—Maurice J. Welsh
*Attorney, Agent, or Firm*—Donald M. Sell; James A. Smith; David R. Cleveland

[57] ABSTRACT

A one-part, solvent free, thermosettable adhesive and coating composition comprising a prepolymer terminated with blocked isocyanate groups and having a melting point below 95° C., a difunctional amine or alcohol which is soluble in the prepolymer at 95° C., a monofunctional amine or alcohol which is soluble in the prepolymer at 95° C., with at least one of the foregoing bearing [furyl or furfuryl] *dienyl* substituents, and a bis-dieneophile.

16 Claims, No Drawings

ONE-PART SOLVENT-FREE THERMOSETTABLE BLOCKED PREPOLYMER COMPOSITION CONTAINING A DIENE, TOGETHER WITH CHAIN EXTENDER, CHAIN TERMINATOR AND A DIENOPHILE

Matter enclosed in heavy brackets [ ] appears in the original patent but forms no part of this reissue specification; matter printed in italics indicates the additions made by reissue.

TECHNICAL FIELD

This invention relates to one-part, solvent-free thermosettable prepolymer compositions, adhesives and coatings containing such compositions, and a method for "staging" said adhesives and coatings.

BACKGROUND ART

Prepolymer compositions which thermally cure into solidified adhesives and coatings should desirably be one part compositions. Multiple part adhesive and coating compositions must be carefully measured, thoroughly mixed, and promptly used, requirements which are inconvenient and may cause waste of materials.

Many adhesive and coating compositions must be dissolved or dispersed in an organic solvent before they can be applied to a workpiece. These solvents are environmentally hazardous and their use should be avoided whenever possible, see "Adhesion and Bonding", Enc. of Polymer Science and Technology, 1, 486, Interscience, 1964.

Processing applications such as printed circuit manufacture often employ "stageable" adhesives, that is, adhesive compositions which can be partially cured to a tack-free coating, fastened to an adherend, and cured using heat, pressure, or both (see. U.S. Pat. No. 4,118,377). The tack-free state is sometimes referred to as the "B-Stage".

Several compositions have been described which embody some but not all of the features of one part formulation, freedom from solvents, and stageability. For example, blocked polyisocyanates which can be used as one-part thermosetting adhesive or coating compositions have been described in Levine and Fech Jr., J. Org. Chem., 37, 1500 (1972), Levine and Fech Jr., J. Paint Tech., 45 (578) 56 (1973), U.S. Pat. No. 3,808,160, and British Patent Specification Nos. 970,459 and 1,085,454. However, these compositions begin to cross-link upon being heated to their deblocking temperature, and therefore cannot be readily B-staged.

U.S. Pat. No. 3,435,003 discloses a method for cross-linking a saturated condensation polymer backbone bearing furan groups by reacting it with a bis-maleimide. The starting polymer backbone is a solid at room temperature, and is mixed with the bis-maleimide by dissolving the polymer in a solvent with heating or by heating the polymer to its melting point. Upon cooling, the composition forms a solid and is said to cross-link to its cured state within a few days at room temperature. The composition of that patent would therefore be difficult to formulate as a one part, stageable composition.

Disclosure of Invention

It is an object of the present invention to provide a one-part, solvent-free thermosettable composition useful as an adhesive and coating. It is also an object of the present invention to provide a stageable adhesvie composition with a long storage life in its B-staged state. It is an additional object of the present invention to provide an adhesive and coating composition with low viscosity, low sensitivity to moisture, and good adhesive properties.

The present invention provides, in one aspect, a one-part, solvent-free thermosettable adhesive and coating composition, comprising in admixture:

(A) a prepolymer having terminal isocyanate substituents of the formula:

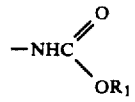

I wherein $R_1$ is $C_6H_5$—or a radical of the formula $(R^2)_2C{=}N$— with each $R^2$ being the same as or different from any other $R^2$ and selected from the group consisting of hydrogen atoms, aliphatic radicals of 1 to 6 carbon atoms and phenyl radicals, and wherein the prepolymer has a number average molecular weight greater than 400 and a melting point less than 95° C.;

(B) about 50 to about 100 mole percent, based on the number of moles of said prepolymer, of at least one difunctional primary or secondary amine or difunctional primary or secondary alcohol chain extender, said chain extender being soluble in said prepolymer at 95° C.;

(C) up to 100 mole percent, based on the number of moles of said prepolymer, of at least one monofunctional primary or secondary amine or monofunctional primary or secondary alcohol chain terminator, said chain terminator being soluble in said prepolymer at 95° C.; and (D) a dienophile selected from the group consisting of:

(i) bis-maleimides of the formula:

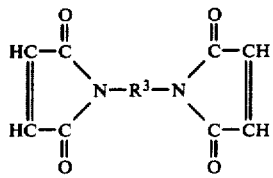

II wherein $R^3$ is phenylene, alkylene, or a radical of the formula:

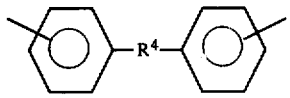

III wherein $R^4$ is —O—, —S—, methylene, or isopropylene;

(ii) tris-maleimides of the formula:

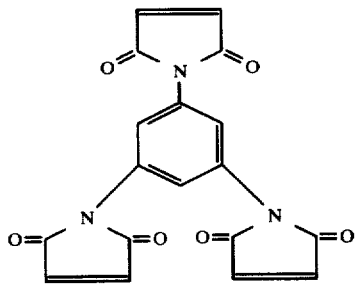

(iii) $\alpha,\beta$ unsaturated diketones having 6 to 22 carbon atoms;

(iv) diacrylates having 8 to 22 carbon atoms;

(v) $\alpha,\beta$ unsaturated dialdehydes having 8 to 22 carbon atoms; and (vi) $\alpha,\beta$ unsaturated dinitriles having 8 to 22 carbon atoms;

with said dienophile being soluble in said prepolymer at 95° C., and wherein at least one of said prepolymer, said chain extender, or said chain terminator has [furyl or furfuryl] substituents of the formula:

IV

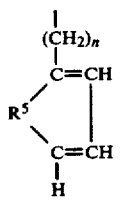

wherein $R^5$ is [a carbon,] $>CH_2$, $>NH$ *or an* oxygen *or* [,] sulfur[, or nitrogen] atom and n is 0 to 10, and wherein the number of moles of dienophilic sites in said dienophile is between about 30 and about 100 percent of the total number of moles of said [furfuryl or furyl] substituents *IV* in said prepolymer, said chain extender, and said chain terminator.

DETAILED DESCRIPTION

In the practice of the present invention, the prepolymer (A) is a straight chain or branched chain, substituted or unsubstituted, saturated or unsaturated, aliphatic or aromatic organic composition having terminal isocyanate groups which are blocked with a leaving group which deblocks at a temperature below about 150° to 175° C. The prepolymer may contain, for example, urethane, urea, ether, ester, amide, or acrylate linkages. Terminal isocyanate groups can be attached to the prepolymer by reacting a diol derivative of the prepolymer with an organic polyisocyanate such as toluene diisocyanate to form an isocyanate terminated polyurethane prepolymer, or by other methods well known in the art. The isocyanate groups can then be blocked with an oxime or a phenol following the procedures described in "Blocked Isocyanates", Z. W. Wicks, Jr., Progress in Organic Coatings, 3 (1975) 73–99. If [the furyl or furfuryl] groups *of* [(] formula IV[)] are to be substituents on the prepolymer, then they can be attached to the prepolymer using methods well known in the art such as esterification of a hydroxyl group on the prepolymer with a furoyl halide, dehydration of a 1,4 diketone, or Michael addition of furyl or furfuryl amine to a suitable electron acceptor such as an $\alpha,\beta$ unsaturated ketone, a nitrile, or an acrylate. Mixtures of more than one prepolymer can be used in this invention. Commercially prepared prepolymers having terminal isocyanate groups and number average molecular weights up to about 3,000, but not containing [furyl or furfuryl] groups *of Formula IV* are commercially available from E. I. du Pont de Nemours & Co. under the trademark "Adiprene" and from Mobay Chemical Corp. under the trademark "Mondour HCB". The ketoxime blocked prepolymer "Adiprene BL16" is a preferred prepolymer.

The chain extender (B) is a difunctional primary or secondary amine or alcohol. Diamines react more rapidly than diols with unblocked isocyanate groups and are preferred. If [the] furyl or furfuryl groups IV are to be substituents on the chain extender, then extenders which contain furyl or furfuryl groups IV are used, such as N,N-bis(2-hydroxyethyl)furfurylamine, N,N'-bis(furfuryl)-1,6-hexanediamine, N,N'-bis(furfuryl)-ethylenediamine, N,N'-bis(furfuryl)-1,10-decanediamine, bis(3-furfurylaminopropyl)methylamine, 1,4-bis(3-furfurylaminopropyl)piperazine, N,N'-bis-(furfuryl)-1,2-propylenediamine, N-methyl-N'-furfuryl-1,6-hexanediamine, 2-(furfurylamino)ethanol, N,N-bis(3-aminopropyl)furfurylamine, bis(3-furfurylamino-propyl)furfurylamine, N-furfuryl-1,3-propanediamine, furfurylsuccinic acid, 2-furfuryl-1,4-butanediol, N,N-bis(2-hydroxyethyl)-2-furanpropylamine, and 2,5-dihydroxymethyl furan. Diamine and diol chain extenders having about 2 to 18 carbon atoms but no [furyl or furfuryl] groups IV can also be used in the present invention. Suitable chain extenders which do not contain [furyl or furfuryl] groups IV include 4,4-methylenedianiline, 1,6-hexanediamine, 1,12-dodecanediamine, and 1,6-hexanediol. Mixtures of more than one chain extender can be used. Preferred chain extenders are N,N'-bis(furfuryl)-1,6-hexanediamine and 2,5-dihydroxymethyl furan. The chain extender is combined with prepolymer in a mole ratio between about 50 and about 100 percent, preferably between about 65 and about 85 percent, and most preferably at about 80 percent.

The chain terminator (C) is a monofunctional amine or alcohol. Amines react more readily than alcohols with unblocked isocyanate groups and are preferred. If [the] furyl or furfuryl groups IV are to be substituents on the chain terminator, then suitable chain terminators which contain furyl or furyl groups IV are used, such as furfurylamine or furfuryl alcohol. Monofunctional amine or alcohol chain terminators having about 1 to 18 carbon atoms but no [furyl or furfuryl] groups IV can also be used in the present invention, such as diethyl amine, methanol, and ethanol. Mixtures of more than one chain terminator can be used. A preferred chain terminator is furfurylamine. The chain terminator is combined with prepolymer in a mole ratio between about 0 and about 100 percent, preferably between about 15 and about 35 percent, and most preferably at about 20 percent.

The total amount of diamine or diol chain extender and amine or alcohol chain terminator should be sufficient to react with all of the prepolymer terminal isocyanate groups. Ordinarily a slight excess of chain extender and chain terminator is used in order to compensate for loss due to the volatility of these components.

The dienophile (D) undergoes Diels-Alder ring formation with [furyl or furfuryl] groups IV, thereby serving as a cross-linking agent. Suitable dienophiles include benzoquinone, ethylene glycol diacrylate, and nonactivated (e.g. non-conjugated), sterically non-hindered olefins such as cyclohexene, ethylene, and propylene.

Mixtures of more than one dienophile can be used. A preferred dieneophile is N,N'-m-phenylenediamaleimide. The dieneophile is combined with prepolymer, chain extender, and chain terminator in a mole ratio of between about 10 and about 100 percent, preferably about 30 and about 50 mole percent, based upon a comparison of the number of moles of dienophilic sites (i.e., the number of sites in the dienophile which could undergo ring formation with a diene) in the crosslinking agent D with the total number of moles of [furyl or furfuryl] groups IV in the prepolymer, chain extender, and chain terminator.

Other adjuvants commonly used in adhesives and coatings such as catalysts, filters, extenders, colorants, wetting agents, surfactants, and antioxidants, can also be added to the compositions of the present invention in order to improve the handling properties of uncured compositions or the performance characteristics of cured compositions. Useful catalysts include dibutyltin dilaurate, stannous octoate, lead octoate, 2,2,1-diazobicyclooctane, tetramethylbutane diamine, dibutylin di-2-ethylhexoate, metallic napthenates, metallic acetylacetonates, and others well known in the art. Dibutyltin dilaurate is a preferred catalyst.

When a composition of the present invention is heated sufficiently to deblock the isocyanate groups on prepolymer (A), then the prepolymer, chain extender (B), and chain terminator (C) react together to form longer polymer chains containing alternating prepolymer and chain extender units and terminal chain terminator units. This chain lengthening reaction proceeds substantially to completion in about 3 to 10 minutes at a temperature of about 150° C. for ketoxime blocked prepolymers and at a temperature of about 175° C. for phenol blocked prepolymers. If heating is continued for another 3 to 10 minutes at about 150° C. or for a shorter period at higher temperatures, a cross-linking reaction will then take place between the [furyl or furfuryl] groups IV (which are carried on the prepolymer, chain extender, or chain terminator) and the dieneophile (D). As the compositions of the present invention are heated, two distinct reactions therefore take place substantially in succesion—chain lengthening by the prepolymer, chain extender, and chain terminator, and cross-linking by the [furyl or furfuryl] groups IV and the dieneophile. This gives the compositions of the present invention their stageable character and enables the physical properties (e.g. viscosity) of the uncured, B-staged, and cured compositions to be readily altered through the use of different amounts of each component A, B, and C or through the use of species of components A, B, and C having increased or decreased molecular weight.

For example, the physical properties of a B-staged composition of the present invention are controlled, in part, by the molecular weight of the lengthened linear chains. Lower molecular weights for such a B-staged composition can be obtained, for example, by using an excess of chain terminator, an amine chain terminator in combination with a diol chain extender, or by using a prepolymer, a chain extender, and a chain terminator having low molecular weight. Also, higher molecular weights for such a B-staged composition can be obtained, for example, by using lesser amounts of chain terminator, an alcohol chain terminator in combination with a diamine chain extender, or by using a prepolymer, a chain extender, and a chain terminator having high molecular weight.

The compositions of the present invention are prepared by combining prepolymer, chain extender, chain terminator, and dienophile using a mixer such as an air stirrer. The resulting mixture has a long shelf life at room temperature, viz. up to one year or more. Although small amounts of the blocking agent volatilize during the chain extension reaction, the product will chain-extend and cross-link without substantial liberation of organic solvents. The compositions of the present invention can be chain-extended and cross-linked by heating them for about 6 to about 20 minutes at about 150° to 175° C., or for about 4 hours at about 95° C., or for intermediate times and temperatures between the above values. The compositions of the present invention can be staged to a solid, tack-free B-stage by heating them for approximately one-half the above time periods, i.e. for about 3 to about 10 minutes at 150° to 175° C., or for about 2 hours at about 95° C., or for intermediate times and temperatures between these values. The B-staged solid can be formed into sheets or granulated into a powder and stored for long periods at room temperature, viz. up to one year or more. The B-staged solid can be cured by reheating for about 3 to about 10 minutes at 150° C. to 175° C., or for about 2 hours at about 95° C., or for intermediate times and temperatures between these values. Bonding of the B-staged composition can be carried out by placing an adherend in contact with the cooled B-staged solid, and by heating the composition and adherend until a bond is formed. Alternatively, the cooled B-staged composition can be heated until it is tacky and then placed in contact with the adherend and bonded using pressure.

The following examples are offered to aid understanding of the present invention and are not to be construed as limiting the scope thereof.

EXAMPLE 1

One hundred grams of toluenediisocyanate/polyether/methylethyl ketoxime prepolymer ("Adiprene BL16", having 5.3 to 5.8 percent available isocyanate, commercially available from E. I. du Pont de Nemours & Co.) were combined with 7.11 g of N,N'-bis(furfuryl)-1,6-hexanediamine chain extender, 5.1 g of 4,4'-methylenedianiline chain extender, and 2.5 g of furfurylamine chain terminator in a 500 ml vessel. After thorough mixing, 8.3 g of N,N'-m-phenylenedimaleimide and 200 mg of dibutyltin dilaurate were added. The mixture was stirred until it became homogeneous. The resulting yellow-colored paste was brushed onto 25 mm × 100 mm strips of 4 kg cotton duck canvas. Several test substrate sample strips measuring 25 mm × 100 mm were obtained. The sample strips were wiped with toluene (except for a sample strip of cold rolled steel which was left coated with the protective oil applied by the steel manufacturer) and brushed with the above yellow-colored paste. The cotton duck and sample strips were then heated in an oven at a temperature of 150° C. (this temperature being referred to hereafter as the "activation temperature") for 4 minutes (this time being referred to hereafter as the "activation time") to convert the paste to a B-staged composition. The canvas strips and test substrates were tacky upon removal from the oven and were immediately bonded together with hand pressure and aged overnight. The aged samples were tested for T-peel strength according to ASTM D-903. The results for each test substrate are set out below in Table I.

TABLE I

| Substrate | Peel strength, kg/cm |
|---|---|
| Aluminum | 5.4–7.1 |
| Cold rolled steel | 7.1–8.9 |
| Cold rolled steel coated with protective oil | 5.9[a] |
| Chrome plated steel | 6.3–7.1 |
| Rigid PVC | 6.3–7.5 |
| Plasticized PVC | [b] |

[a]only one sample tested
[b]substrate failed

EXAMPLE 2

Adhesive compositions containing 250 g (100 mole percent) "Adiprene BL16" prepolymer, 20.8 g (65 mole percent) furfurylamine chain terminator, 15.8 g (35 mole percent) N,N'-bis-furfuryl-1,6-hexanediamine chain extender, 944 mg (0.5 mole percent) dibutyltin dilaurate, and varying amounts of N,N'-m-phenylenedimaleimide dienophile (at amounts of 22 g for a 50 mole percent addition, and 44.1 g for a 100 mole percent addition) were prepared as described in Example 1 . The adhesive qualities of these compositions after various activation temperatures and times were evaluated using the following test. Two strips of a 6 mm birch plywood 25 mm×100 mm in size were coated with adhesive. A 25 mm wide×175 mm long bonded assembly was formed by adhering one end of one strip to one end of the other strip with a 25 mm overlap between adjacent ends. The adhesive bond was pressed with a 1.81 kg roller. The bond was allowed to set for a measured period (this setting time being referred to hereafter as the "set time") and then tested by supporting the ends of the bonded assembly in a horizontal plane and fastening a 2.267 kg weight to the center of the bonded area.

The mole percent dienophile used (compared to the number of moles of furyl and furfuryl groups present), activation temperature, activation time, set time, and test results are set forth below in table II.

TABLE II

| Run no. | Mole percent dienophile | Activation temperature, °C. | Activation time, min. | Set time, min. | Test result[a] |
|---|---|---|---|---|---|
| 1 | 50 | 121 | 6 | 3 | F |
| 2 | 50 | 121 | 12 | 3 | F |
| 3 | 50 | 135 | 12 | 3 | F |
| 4 | 100 | 121 | 6 | 60 | F |
| 5 | 100 | 121 | 8 | 3 | F |
| 6 | 100 | 121 | 8 | 60 | F |
| 7 | 100 | 135 | 8 | 3 | F |
| 8 | 100 | 135 | 8 | 60 | H |
| 9 | 100 | 121 | 10 | 3 | F |
| 10 | 100 | 121 | 10 | 60 | H |
| 11 | 100 | 135 | 10 | 3 | H |
| 12 | 100 | 121 | 12 | 3 | H |

[a]F = bond failed, H = bond held

EXAMPLE 3

An adhesive composition containing 100 mole percent dienophile (compared to the number of moles of furyl and furfuryl groups present) was prepared as described in Example 2. The stageability and "open time" of this composition was evaluated as follows.

The adhesive composition was coated onto 6 mm birch plywood strips as described in Example 2. The adhesive was brought to a "B-staged" condition by heating in an oven at 135° for 8 minutes. The samples were cooled to room temperature for 24 hours. The samples were reactivated by heating in an oven at 135° C. for various measured times, pressed together using hand pressure, and tested as in Example 2. Set out below in Table III are the activation temperature, activation time, set time and bond test results for this composition.

TABLE III

| Run no. | Activation temperature °C. | Activation time, min | Set time, min | Test result |
|---|---|---|---|---|
| 13 | 121 | 10 | 3 | F |
| 14 | 135 | 10 | 3 | F |
| 15 | 121 | 12 | 3 | H |
| 16 | 135 | 12 | 3 | H |

Open time was evaluated for this composition by placing a sheet of Kraft paper against a reactivated sample. The Kraft paper could be applied to and removed from the bond with fibre tearing up to 150 seconds after removal of the reactivated sample from the oven.

EXAMPLE 4

An adhesive composition was prepared as described in Example 3. The composition was tested for overlap shear strength using 6 mm birch plywood strips bonded to one another as in Example 2. Overlap shear strengths were measured on a Scott tensile tester (Scott Testing Inc.). Set out below in Table IV are the overlap shear strength for several samples after various activation temperatures and activation times.

TABLE IV

| Run no. | Activation temperature, °C. | Activation time, min | Overlap shear strength, kg/cm$^2$ |
|---|---|---|---|
| 17 | 93 | 12 | >7 |
| 18 | 93 | 14 | 20.4 |
| 19 | 121 | 10 | 17.6 |
| 20 | 121 | 12 | 22.5 |
| 21 | 121 | 14 | 25.7 |
| 22 | 135 | 6 | 17.6 |
| 23 | 135 | 8 | 28.8 |
| 24 | 135 | 12 | 33.0 |
| 25 | 135 | 14 | 33.7 |

EXAMPLE 5

An adhesive composition was prepared and coated onto birch plywood strips as described in Example 4. The adhesive was activated to its B-Stage by heating in an oven at 135° C. for 8 minutes. The B-staged samples were cooled overnight and then reactivated at 135° C. for various periods of time. The reactivated samples were bonded together and tested for overlap shear strength as described in Example 4. Set out below in Table V are the reactivation temperature, reactivation time, and overlap shear strength for several samples. The data indicate a good "pot life" during reactivation.

TABLE V

| Run no. | Reactivation temperature, °C. | Reactivation time, min. | Overlap shear strength, kg/cm$^2$ |
|---|---|---|---|
| 26 | 135 | 10 | 26.4 |
| 27 | 135 | 12 | 29.5 |
| 28 | 135 | 18 | <33.7 |
| 29 | 135 | 20 | <33.7 |

TABLE V-continued

| Run no. | Reactivation temperature, °C. | Reactivation time, min. | Overlap shear strength, kg/cm² |
|---|---|---|---|
| 30 | 135 | 22 | <33.7 |

EXAMPLE 6

An adhesive composition was prepared and coated onto birch plywood strips as described in Example 4. The adhesive was activated in an oven at 135° C. for various periods of time. The plywood strips were then bonded to one another with 625 mm² overlap area and hung vertically in an oven. The bonds were tested for heat resistance by hanging a 0.9 kg weight from the bonded assembly and raising the oven temperature at the rate of 5.5° C., every 3 minutes until the bond failed. Set out below in Table VI are the activation temperature, activation time, and bond failure temperature for several samples.

TABLE VI

| Run no. | Activation temperature, °C. | Activation time, min | Bond failure temperature, °C. |
|---|---|---|---|
| 31 | 135 | 10 | 60 |
| 32 | 135 | 12 | 71.1 |
| 33 | 135 | 14 | 76.7 |
| 34 | 135 | 18 | 82.2 |
| 35 | 135 | 20 | 87.8 |

EXAMPLE 7

An adhesive composition was prepared containing 250 g (100 mole percent) "Adiprene BL16" prepolymer, 12.8 g (40 mole percent) furfurylamine chain terminator, 18.1 g (40 mole percent) N,N-bis(furfuryl)-1,6-hexanediamine chain extender, 6.5 g (20 mole percent) 4,4-methylene dianiline chain extender, 31.8 g (72 mole percent) N,N'-m-phenylenedimaleimide dienophile, and 944 mg (0.5 mole percent) dibutyltin dilaurate. The composition was activated and tested as in Example 1. Set out below in Table VII are peel strength tests for solvent wiped cold rolled steel bonded to canvas at several activation times.

TABLE VII

| Run no. | Activation temperature, °C. | Activation time, min | Peel strength kg/cm |
|---|---|---|---|
| 36 | 150 | 4 | 4.5–4.8[a] |
| 37 | 150 | 5 | 6.3[a] |
| 38 | 150 | 6 | 8.0[a] |
| 39 | 150 | 8 | 8.9–9.8[a] |
| 40 | 150 | 10 | 4.3[b] |

[a]tested at room temperature
[b]tested at 65° C.
Samples tested at room temperature did not fail at the bond line.

EXAMPLE 8

An adhesive composition was prepared containing 100 mole percent "Adiprene BL16" prepolymer, 30 mole percent furfurylamine chain terminator, 30 mole percent N,N'-bis-furfuryl-1,6-hexanediamine chain extender, 40 mole percent 4,4-methylene dianiline chain extender, 72 mole percent N,N'-m-phenylenedimaleimide dienophile, and 0.5 mole percent dibutyltin dilaurate. The composition was coated onto cold rolled steel and canvas as in Example 1. The composition was next activated in an oven at 149° C. for 10 minutes. Test samples were immediately bonded and then stored for 24 hours prior to testing. The samples were tested for peel strength at elevated temperatures by heating to various temperatures and testing for peel strength as in Example 1. Set out below in Table VIII are the test temperature and peel strength for several samples. This data illustrates the excellent peel strength of the composition of this example at elevated temperatures.

TABLE VIII

| Run No. | Test temperature, °C. | Peel Strength, kg/cm |
|---|---|---|
| 41 | 20 | 7.1 |
| 42 | 51.7 | 5.0 |
| 43 | 65.6 | 4.1 |
| 44 | 79.4 | 3.8 |
| 45 | 93.3 | 2.7 |
| 46 | 101.7 | 1.3–1.4 |

EXAMPLE 9

In a series of 9 runs, adhesive compositions containing 3 different levels of chain terminator and chain extender were prepared and activated for 3 different periods of time. Each of the compositions contained 100 mole percent "Adiprene BL16" prepolymer and a total of 100 mole percent furfurylamine chain terminator and N,N-bis(furfuryl)-1,6-hexanediamine chain extender. The compositions also contained sufficient N,N'-m-phenylenedimaleimide dienophile to react with 60 percent of available furan groups, and 0.5 mole percent dibutyltin dilaurate catalyst. The compositions were adhered to cold rolled steel (which had been previously wiped with toluene) and tested for peel strength as in Example 1. Set out below in Table IX are the mole ratio of chain terminator to chain extender, activation time, and peel strength for the resulting compositions. As the amount of chain terminator relative to chain extender is increased in these runs, peel strength decreases.

TABLE IX

| Run no. | Ratio of chain terminator to chain extender | Activation temperature, °C. | Activation time, min | Peel strength, kg/cm |
|---|---|---|---|---|
| 47 | 40/60 | 149 | 5 | 6.1 |
| 48 | " | " | 6 | 7.9 |
| 49 | " | " | 8 | 9.8 |
| 50 | 50/50 | " | 6 | 4.1 |
| 51 | " | " | 8 | 5.9 |
| 52 | " | " | 9 | 7.7 |
| 53 | 55/45 | " | 5 | 1.1 |
| 54 | " | " | 7 | 3.6 |
| 55 | " | " | 9 | 5.4 |

EXAMPLE 10

In a series of 9 runs, adhesive compositions containing 3 different levels of dienophile were prepared and adhered to 3 different substrates. Each of the compositions contained 100 mole percent "Adiprene BL16" prepolymer, 40 mole percent furfurylamine chain terminator, 40 mole percent N,N-bis(furfuryl)-1,6-hexanediamine chain extender, 20 mole percent 4,4'-methylene dianiline chain terminator, and 0.5 mole percent dibutyltin dilaurate catalyst. The compositions were coated on various substrates, activated in an oven at 149° C. for 10 minutes, and tested as in Example 1. Set out below in Table X are the amount of N,N'-m-phenylenedimaleimide dienophile (based on the mole percent of available furan groups), test substrate used, and peel strength for each of the resulting compositions.

TABLE X

| Run no. | Mole percent dienophile | Test substrate | Peel strength kg/cm |
|---|---|---|---|
| 56 | 0 | cold rolled steel/canvas | 1.3 |
| 57 | " | aluminum/canvas | 1.1 |
| 58 | " | PVC/canvas | 1.4 |
| 59 | 10 | cold rolled steel/canvas | 2.5-2.9 |
| 60 | " | aluminum/canvas | 2.5-2.9 |
| 61 | " | PVC/canvas | 1.3-2.9 |
| 62 | 25 | cold rolled steel/canvas | 2.9-3.8 |
| 63 | " | aluminum/canvas | 3.4 |
| 64 | " | PVC/canvas | 3.6-4.3 |

EXAMPLE 11

An adhesive composition was prepared according to Example 5 but containing 60 mole percent ethylene glycol diacrylate as the dienophile. The composition was applied to various substrates, activated in an oven for various periods of time, and tested as in Example 1. Set out below in Table XI are the activation temperature, activation time, test substrate used, and peel strength for this composition.

TABLE XI

| Run no. | Activation temperature, °C. | Activation time, min | Test substrate | Peel strength, kg/cm |
|---|---|---|---|---|
| 65 | 149 | 8 | cold rolled steel/canvas | 1.8 |
| 66 | " | " | aluminum/canvas | 1.4 |
| 67 | " | 16 | cold rolled steel/canvas | 2.9 |
| 68 | " | " | aluminum/canvas | 2.3 |

Various modifications and alterations of this invention will be apparent to those skilled in the art without departing from the scope and spirit of this invention and the latter should not be restricted to that set forth herein for illustrative purposes.

What is claimed is:

1. A one-part, solvent-free, thermosettable adhesive and coating composition, comprising in admixture:

(A) a prepolymer having terminal isocyanate substituents of the formula:

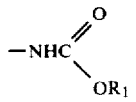

wherein $R_1$ is $C_6H_5$— or a radical of the formula $(R^2)_2C{=}N$— wherein each $R^2$ is the same or different and is selected from the group consisting of hydrogen atoms, aliphatic radicals of 1 to 6 carbon atoms, and phenyl radicals, and wherein said prepolymer has a number average molecular weight greater than 400 and a melting point less than 95° C.;

(B) about 50 to about 100 mole percent, based on the number of moles of said prepolymer, of at least one difunctional primary or secondary amine or difunctional primary or secondary alcohol chain extender, said chain extender being soluble in said prepolymer at 95° C.;

(C) up to 100 mole percent, based on the number of moles of said prepolymer, of at least one monofunctional primary or secondary amine or monofunctional primary or secondary alcohol chain terminator, said chain terminator being soluble in said prepolymer at 95° C.; and (D) a dienophile selected from the group consisting of:

(i) bis-maleimides of the formula:

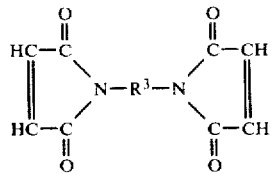

wherein $R^3$ is phenylene, alkylene, or a radical of the formula:

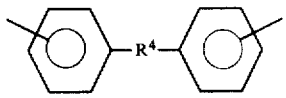

wherein $R^4$ is —O—, —S—, methylene, or isopropylene;

(ii) tris-maleimides of the formula:

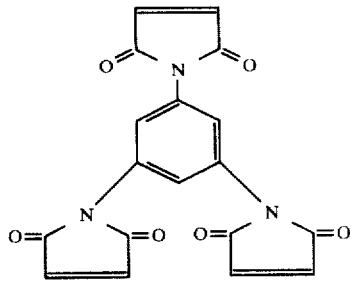

(iii) $\alpha,\beta$ unsaturated diketones having 6 to 22 carbon atoms;

(iv) diacrylates having 8 to 22 carbon atoms;

(v) $\alpha,\beta$ unsaturated dialdehydes having 8 to 22 carbon atoms atoms; and (vi) $\alpha,\beta$ unsaturated dinitriles having 8 to 22 carbon atoms;

wherein said dienophile is soluble in said prepolymer at 95° C., and wherein at least one of said prepolymer, said chain extender, or said chain terminator has [furyl or furfuryl] substituents of the formula:

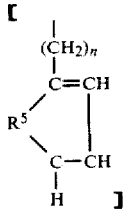

IV

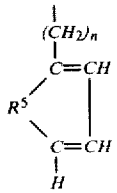

wherein $R^5$ is [a carbon,] $>CH_2$, $>NH$, *or an* oxygen [,] *or* sulfur [, or nitrogen] atom and n is 0 to 10, and wherein the number of moles of dienophilic sites in said dienophile is between about 10 and about 100 percent of the total number of moles of said [furyl or furfuryl] substituents *IV* in said prepolymer, said chain extender, and said chain terminator.

2. A composition according to claim 1, wherein $R_1$ has the formula $(R^2)_2C{=}N{-}$.

3. A composition according to claim 1, wherein said chain extender is combined with said prepolymer in a mole ratio between about 65 and about 85 percent.

4. A composition according to claim 2, wherein said chain extender comprises an amine.

5. A composition according to claim 3, wherein said chain extender comprises N,N'-bis(furfuryl)-1,6-hexanediamine.

6. A composition according to claim 3, wherein said chain extender comprises a mixture of N,N'-bis(furfuryl)-1,6-hexanediamine and 1,6 hexanediamine.

7. A composition according to claim 1, wherein said chain terminator is combined with said prepolymer in a mole ratio between about 15 and about 35 percent.

8. A composition according to claim 7, wherein said chain terminator comprises an amine.

9. A composition according to claim 7, wherein said chain terminator comprises furfurylamine.

10. A composition according to claim 1, wherein said dienophile is combined with said prepolymer, said chain extender, and said chain terminator in a mole ratio between about 30 and about 50 percent based upon a comparison of the number of moles of said dieneophile with the number of moles of said [furyl or furfuryl] substituents *IV* in said prepolymer, said chain extender, and said chain terminator.

11. A composition according to claim 10, wherein said dienophile comprises a bis-maleimide.

12. A composition according to claim 10, wherein said dienophile comprises N,N'-m-phenylenedimaleimide.

13. A one-part, solvent-free, thermosettable adhesive and coating composition, comprising in admixture:

(A) a prepolymer having two terminal isocyanate substituents of the formula:

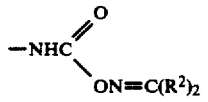

wherein each $R^2$ is the same as or different from any other $R^2$, is selected from the group consisting of hydrogen atoms, aliphatic radicals of 1 to 6 carbon atoms, and phenyl radicals, and said prepolymer has a number average molecular weight greater than 400 and a melting point less than 95° C.;

(B) N,N'-bis(furfuryl)-1,6-hexanediamine chain extender, combined with said prepolymer in a mole ratio between about 65 and about 85 percent based upon a comparison the number of mole of said chain extender with the number of moles of said prepolymer;

(C) furfurylamine chain terminator, combined with said prepolymer in a mole ratio between about 15 and about 35 percent based upon a comparison of the number of moles of said chain terminator with the number of moles of said prepolymer;

(D) N,N'-m-phenylenedimaleimide cross-linking agent, combined with said prepolymer, said chain extender, and said chain terminator in a mole ratio between about 30 and about 50 percent based upon a comparison of the number of moles of said cross-linking agent to the total of twice the number of moles of said chain extender plus the number of moles of said chain terminator.

14. A method for preparing a stageable adhesive composition, comprising the steps of:

(A) melting a prepolymer having two terminal isocyanate substituents of the formula:

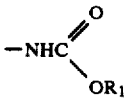

wherein $R^1$ is $C_6H_5{-}$ or a radical of the formula $(R^2)_2C{=}N{-}$, with each $R^2$ being the same or different as any other $R^2$ and selected from the group consisting of hydrogen atoms, aliphatic radicals of 1 to 6 carbon atoms, and phenyl radicals, and said prepolymer has a number average molecular weight greater than 400 and a melting point less than 95° C.

(B) admixing therewith, per mole of said prepolymer, from about 0.5 to about 1 mole of at least one difunctional primary or secondary amine or difunctional primary or secondary alcohol chain extender and up to about 1 mole of at least one monofunctional primary or secondary amine or monofunctional primary or secondary alcohol chain terminator, with said chain extender and said chain terminator being soluble in said prepolymer at 95° C., and at least one of said prepolymer, said chain extender, or said chain terminator having [furyl or furfuryl] substituents of the formula:

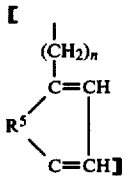

*IV*

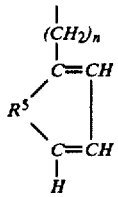

wherein $R_5$ is [a carbon,] $>CH_2$, $>NH$, *or an* oxygen [,] *or* sulfur [or nitrogen] atom and n is 0 to 10;

(C) admixing therewith, per mole of said [furyl or furfuryl] substituents *IV*, from about 0.1 to about 1 mole of a dienophile selected from the group consisting of:

(i) bis-maleimides of the formula:

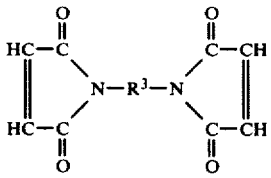

wherein $R^3$ is phenylene, alkylene, or a radical of the formula:

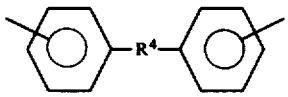

wherein $R^4$ is —O—, —S—, methylene, or isopropylene;

(ii) tris-maleimides of the formula:

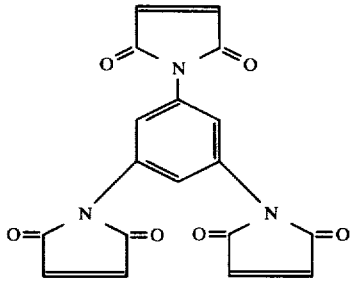

(iii) α,β unsaturated diketones having 6 to 22 carbon atoms;

(iv) diacrylates having 8 to 22 carbon atoms;

(v) α,β unsaturated dialdehydes having 8 to 22 carbon atoms; and (vi) α,β unsaturated dinitriles having 8 to 22 carbon atoms;

wherein said dienophile is soluble in said prepolymer at 95° C.;

(D) coating the resulting admixture on an adherend; and (E) heating said coating to convert it to a solid, tack-free, B-staged adhesive composition.

15. A method according to claim 14, further comprising the steps of:

(F) placing a second adherend in contact with said B-staged adhesive composition; and (G) heating said B-staged adhesive composition until a bond is formed between said first and said second adherends.

16. A method according to claim 14, further comprising the steps of:

(F) heating said B-staged adhesive composition until it becomes tacky;

(G) placing a second adherend in contact with said heated B-staged adhesive composition; and (H) applying pressure to said first and second adherends composition until a bond is formed between said first and second adherends.

* * * * *

UNITED STATES PATENT AND TRADEMARK OFFICE

CERTIFICATE OF CORRECTION

PATENT NO. : Re. 31,670

DATED : September 11, 1984

INVENTOR(S) : Manuel J. Arco

It is certified that error appears in the above—identified patent and that said Letters Patent is hereby corrected as shown below:

Column 8, line 38, replace ">7" with -- <7--.

Column 8, lines 68-69, replace "<33.7" with -->33.7--.

Column 9, line 4, replace "<33.7" with -->33.7--.

Signed and Sealed this

*Twenty-seventh* Day of *August 1985*

[SEAL]

*Attest:*

DONALD J. QUIGG

*Attesting Officer* *Acting Commissioner of Patents and Trademarks*